No. 699,358. Patented May 6, 1902.
G. WILSON.
PITMAN.
(Application filed Aug. 31, 1901.)
(No Model.)
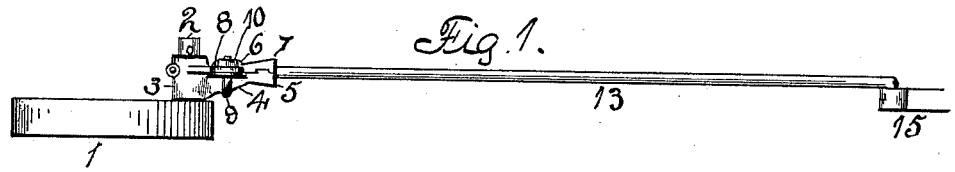
Fig. 1.
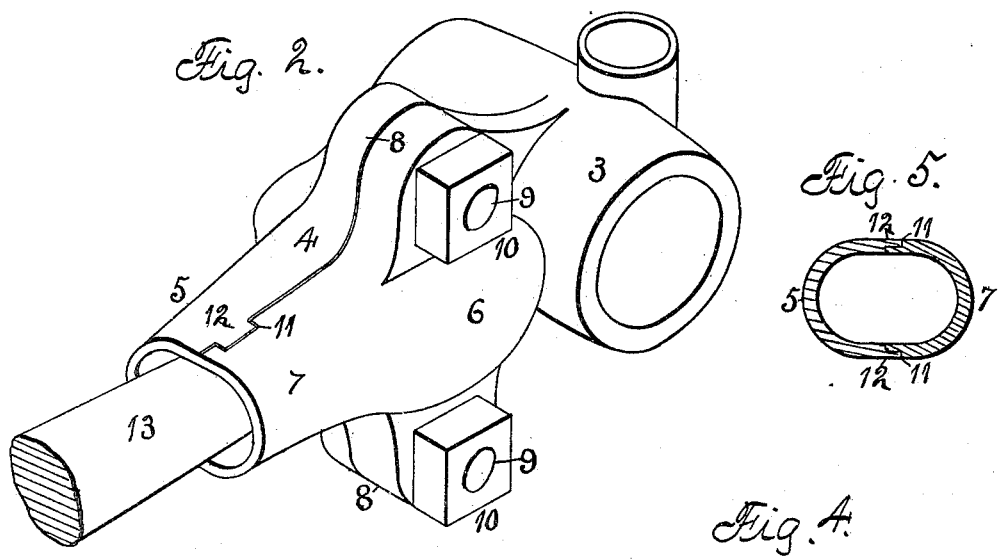
Fig. 2.
Fig. 5.
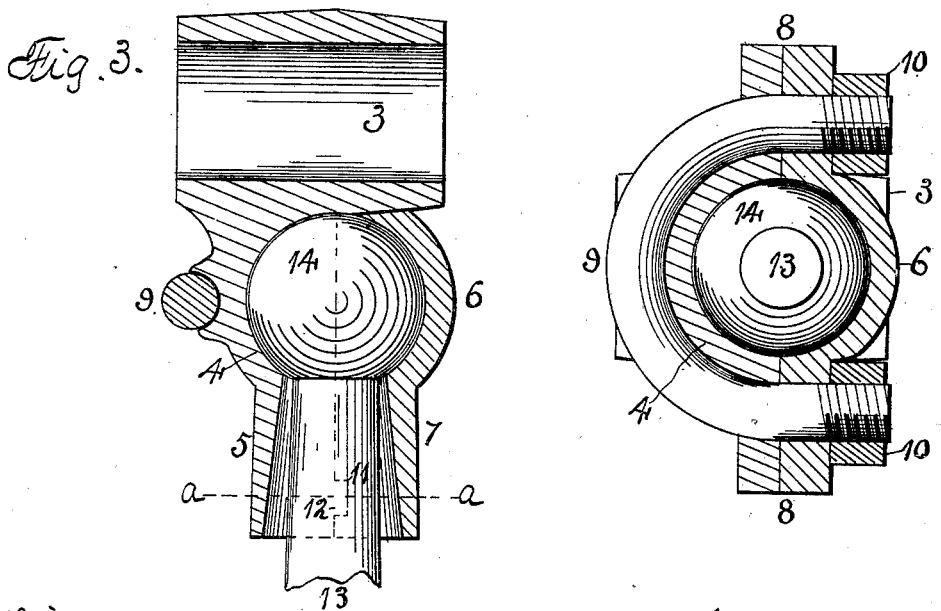
Fig. 3.
Fig. 4.
Witnesses:
E. Behel.
B. B. Cox.
Inventor:
George Wilson
By A. O. Behel
Atty
THE NORRIS PETERS CO., PHOTO-LITHO., WASHINGTON, D. C.

UNITED STATES PATENT OFFICE.

GEORGE WILSON, OF ROCKFORD, ILLINOIS, ASSIGNOR TO EMERSON MANUFACTURING COMPANY, OF ROCKFORD, ILLINOIS.

PITMAN.

SPECIFICATION forming part of Letters Patent No. 699,358, dated May 6, 1902.

Application filed August 31, 1901. Serial No. 74,033. (No model.)

*To all whom it may concern:*

Be it known that I, GEORGE WILSON, a citizen of the United States, residing at Rockford, in the county of Winnebago and State of Illinois, have invented certain new and useful Improvements in Pitmen, of which the following is a specification.

The object of this invention is to construct a pitman for mowing and harvesting machines, of which the pitman-head has a pivotal connection with the crank-head and the pitman-rod has a ball-and-socket connection with the pitman-head.

In the accompanying drawings, Figure 1 is a plan view of my improved pitman in connection with the crank-head. Fig. 2 is an isometrical representation of my improved pitman-head and pitman-rod. Fig. 3 is a horizontal section through the pitman-head. Fig. 4 is a vertical section through the pitman-head at the point of the ball-and-socket connection between the pitman-head and pitman-rod. Fig. 5 is a section on dotted line *a*, Fig. 3.

The crank-head 1 has a connection with the driven parts of the mowing or harvesting machine in a manner to be rotated and is provided with a wrist-pin 2.

My improved pitman-head comprises the main section and cap. The main section has a tubular portion 3 of a size to receive the wrist-pin. One-half 4 of a socket extends from the tubular portion and has a shank portion 5. A cap 6 forms one-half of a socket and has a shank portion 7. Both sections of the socket have ears 8, and a staple 9, having its ends threaded, passes through the ears and receives nuts 10 on its projecting ends. The shank portion 7 of the cap is provided with notches 11, and the shank portion 5 has projections 12, so that when the parts are connected by the staple they will also be locked against lateral movement. One end of the pitman-rod 13 is provided with a ball 14, which is located within the socket of the pitman-head. The other end of the pitman-rod has a connection with the knife-head 15 in the usual manner. As the crank-head revolves a reciprocating movement will be imparted to the knife-head through the pitman-head and pitman-rod. The ball-and-socket connection between the pitman-rod and pitman-head permits the rocking movement of the cutter-bar, and the elongated opening in the shank portion of the pitman-head accommodates any back-and-forth movement of the cutter-bar.

I claim as my invention—

1. In a pitman, the combination of a pitman-head fitted to receive a wrist-pin of a crank-head, a projection extending at right angles from the pitman-head, a cap secured in connection with the projection, the projection and cap having their meeting faces provided with semispherical recesses and a pitman-rod having a ball at one end and located in the recesses.

2. In a pitman, the combination of a pitman-head fitted to receive a wrist-pin of a crank-head, a projection extending at right angles from the pitman-head, a cap secured in connection with the projection, the projection and cap having their meeting faces provided with semispherical recesses and a pitman-rod having a ball at one end and located in the recesses, the free ends of the projection and cap forming an elongated opening for the movement of the pitman-rod.

GEORGE WILSON.

Witnesses:
   A. O. BEHEL,
   E. BEHEL.